April 21, 1970 E. C. FORCIER 3,508,151
CARD TYPE PROBE HEAD HAVING KNOB ANCHORED CONTACTING ENDS
Filed April 18, 1966 2 Sheets-Sheet 1
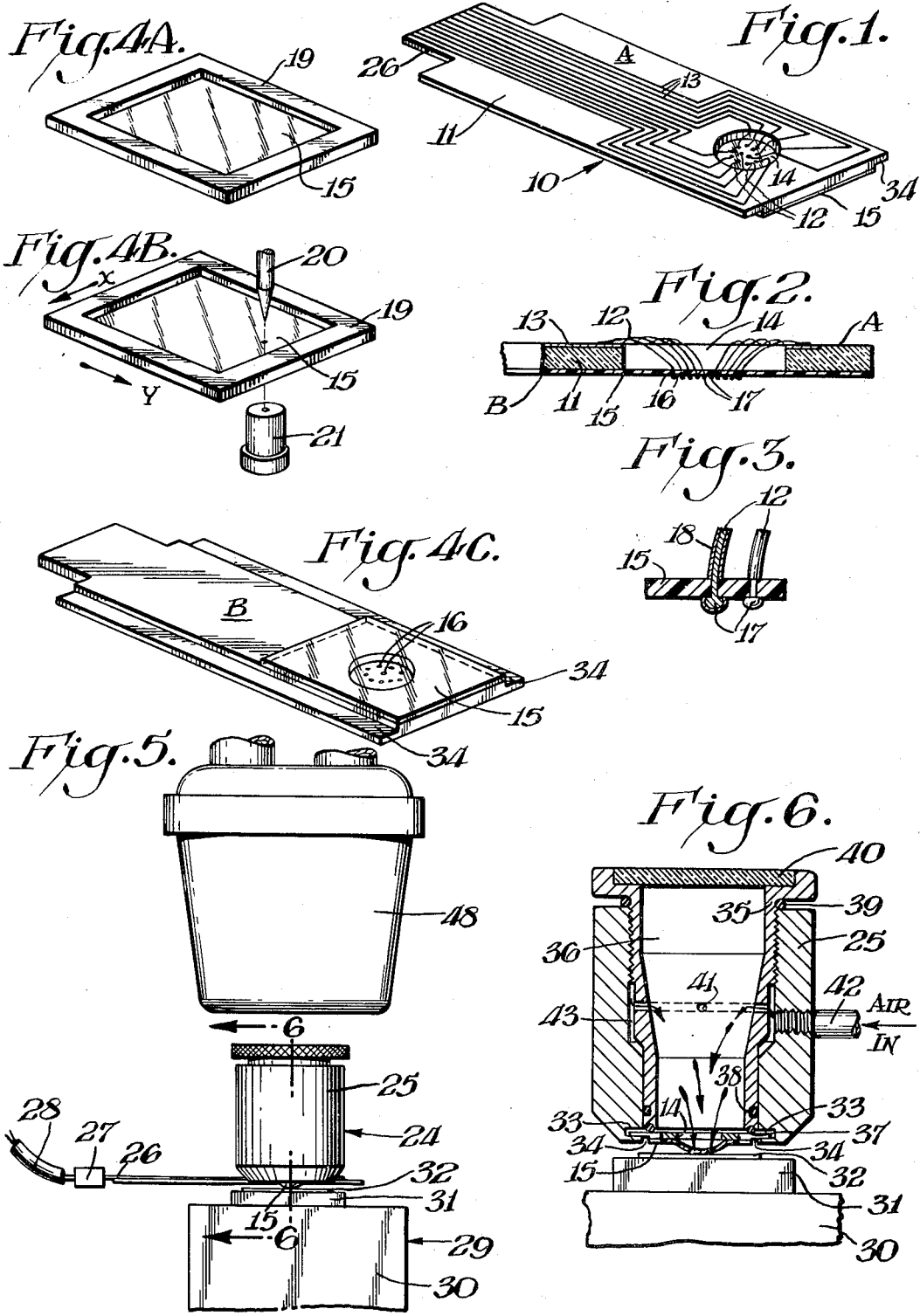

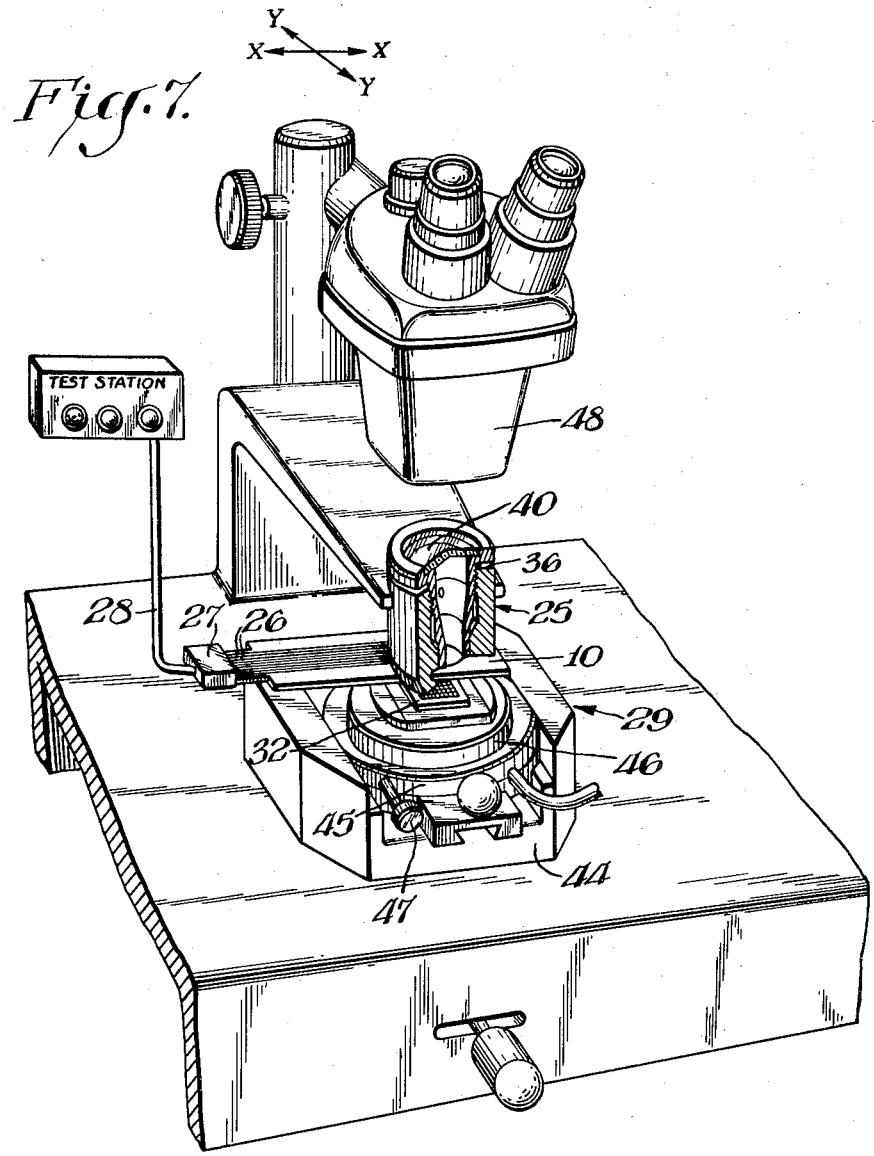

United States Patent Office 3,508,151
Patented Apr. 21, 1970

3,508,151
CARD TYPE PROBE HEAD HAVING KNOB
ANCHORED CONTACTING ENDS
Edward C. Forcier, Worcester, Mass., assignor, by mesne
assignments, to Sprague Electric Company, a corporation of Massachusetts
Filed Apr. 18, 1966, Ser. No. 543,235
Int. Cl. G01r 31/22
U.S. Cl. 324—158                            4 Claims

ABSTRACT OF THE DISCLOSURE

A probe head includes an insulating card having a plurality of electrical contacts extending from a common terminal area along one surface of the card to an aperture located remote from the terminal area. An insulating film across the aperture carries a plurality of closely spaced wires secured in the film and individually extending to the electrical contacts on the surface of the card. The insulating film has sufficient flexibility to permit the secured wires to be urged into contact with probe areas on a semiconductive device.

---

This invention relates generally to means for electrically testing closely spaced electrical positions and more particularly to the means of contacting the closely spaced electrical positions and a method of producing the contacting means.

The testing of miniaturized electrical parts involves bringing test contact points into electrical contact with closely spaced positions, running an electrical test or tests through these contacted positions by attachment to suitable test apparatus and disconnecting and removing the tested parts for further assembly steps. Among other miniature electrical devices having closely spaced contact positions are integrated circuits and transistors formed on a semiconductive wafer. The electrical testing of components formed on a semiconductive wafer is referred to as probing.

The process of probing comprises the steps of contacting selected probing areas as for example of an integrated circuit with a probe means which is electrically connected to a parameter test station and makes an electrical parameter check. In suitable apparatus selected probing areas of a plurality of similar circuits may be tested in succession to expedite and simplify the testing of a large number of circuits.

The apparatus for bringing the probe means into contact with the probe areas and establishing the electrical contact can be either a fixed probe head holding the probe means with the tested units presented sequentially thereto or a probe means containing the requisite probe points for the probe areas mounted on an index head which possesses movement in the XYZ coordinates. The first apparatus is generally associated with testing of transistors while the testing of integrated circuits require the use of the latter apparatus.

The prior art multiple probing points presently used for testing integrated circuits on a semiconductor wafer involve several objectionable features. The probe points have to be individually adjustable to permit adaptation to the configuration of the varied probing areas of the various integrated circuit patterns encountered in normal production. The complications and delay accompanying this adjustment are undesirable. If a variety of different device configurations must be probed and tested within a limited time period, the necessary adaptation of the probe head becomes a major factor in the completion of the testing. The probe head change-over time is objectionably long. Further, the individual probe point presently used is an intricate, delicate and expensive device in itself. Integrated circuit devices to be tested may contain as many as 50 probe areas, each area requires an individual probe point. With each addition of a probe area the probe cost is increased by the cost of the additional probe head. Another undesirable consideration is the significant mechanical degradation of the metallized probe areas on the silicon wafer by faulty adjustment of the probe points. Aside from the difficulty in making the initial adjustment of the probe points, it is difficult to avoid incorrect pressure on the probe area or a slight scratching motion as the probe points contact the respective probe areas in moving from circuit to circuit.

An object of the present invention is to provide a novel probe means that is relatively simple in construction, economical of space and adjustment, and readily adaptable to various minute and complex electrical circuits formed on a semiconductor wafer.

A further object is a method of making a test probe having a large number of closely spaced probe points resiliently supported.

This and other objects of this invention will become more apparent upon consideration of the following description taken together with the accompanying drawings in which:

FIGURE 1 is a perspective view of a probe head of this invention;

FIGURE 2 is a fragmentary vertical section of the probe head of FIGURE 1;

FIGURE 3 is a greatly enlarged fragmentary section of a part of the probe head showing probe points and lead wires;

FIGURES 4a–c represent steps in a method of preparing a part of the novel probe head of this invention;

FIGURE 5 is a front elevation of a probe means assembly containing the probe head of FIGURE 1 and the device holding means;

FIGURE 6 is a vertical section of the probe assembly of FIGURE 5 taken on line VI—VI of FIGURE 5; and FIGURE 7 is a perspective view partly in section of the preferred embodiment of the present invention showing the test station in schematic.

Briefly, the apparatus includes a card which is adapted to be connected to testing equipment and mounted in means for bringing probe points into electrical connection with probe areas in very small or minute electrical devices such as microcircuits. The card is proportioned to carry a number of contacts which connect individual probe wire leads to individual terminals in a receptacle connected to the test equipment. The card had two major surfaces with an aperture extending through the card from one major surface to the other. A flexible insulating film is mounted across this aperture and carries the individual probe wire leads. In one preferred embodiment the film is resiliently mounted on the major surface of the card opposite to the surface carrying the interconnecting contacts. The probe wire leads are anchored in the thin film and are each attached to an individual interconnecting contact. The film is provided with minute perforations and a probe wire lead passes through each perforation and terminates in a knob-like probe point on the outboard side of the film that is opposite to the interconnecting contacts on the card. The probe wire leads are of a size to provide a friction fit in the perforations. In a peferred embodiment the knob-like probe point on the outboard side of the film and a suitable coating on the probe wire lead on the inboard side of the film contiguous with the film serve to anchor the probe wire lead in the film. The dimensions of the perforations and the probe leads and the spacing therebetween are of the order of the spacing between the closely spaced electrical connection areas of the devices to be tested, as for example, the probe areas of integrated circuits.

A most effective film is a very thin sheet of insulating material having satisfactory resistivity properties. Preferably the insulating film also has satisfactory tensile strength good tear properties and flexibility. For example, polyester films such as polyethylene terephthalate (Mylar), polyimide films such as the tetrabasic acid and aromatic diamine polymer (Kapton), and polystyrene films are satisfactory films. The volume and surface resistivities of these materials at room temperature are in excess of $10^{15}$ ohm-cm. and $10_{15}$ ohms,, respectively, and the tensile strength exceeds about 10,000 p.s.i. This invention however, is not limited to films of materials having property values equivalent to these specific materials, but includes films of materials which permits perforation on very close centers without tearing, and which provide, at test voltages, insulation between conductors spaced a few mils apart in the perforations.

It will be readily understood that the arrangement of perforations and probe points in a probe head of this invention can be designed to match the probe areas of various integrated circuit configurations. A plurality of probe points can be provided in the probe head which equals the number of probe areas and which match in configuration the probe areas of an integrated circuit.

The probe head in turn is removably installed in a holder housing and the connecting conductors removably engageable with individual terminals in a receptacle of a test system. Apparatus for supporting and moving the tested devices is associated with the probe head holder so that means in the probe head holder can bring the probe points into electrical connection with probe areas of the device.

A novel method of producing the probe head is provided by holding a very thin flexible insulating film taut on a frame, perforating the supported film with a punch and die, forming fine wire leads with knob-like terminations, inserting the wire leads through the respective perforations and engaging the terminations against one surface of the film, connecting the wire leads to interconnections on a non-conductive card and then building up thickness of the leads to secure the leads in the film.

PROBE HEAD

Referring now particularly to FIGURES 1–3 there is shown a probe head 10 prepared according to this invention comprising a card 11 of a lightweight insulating material carrying probe wires 12. A number of metallic contacts 13 are applied on a major surface A, as by metallization. The card 11 is formed with an aperture 14. The fragmentary vertical section of FIGURE 2 shows a thin film element 15, preferably consisting of a transparent and insulating material such as Mylar attached to the other major surface B of the card 11 and stretched across the aperture 14. The wires 12 extend through the film 15 and each are electrically connected to one of the conductive contacts 13 by a suitable bond. The enlarged fragmentary view of FIGURE 3 shows the structure of the attachment of wires 12 through film 15. The film 15 is provided with minute perforations 16 and the probe wires 12 extend through the perforations 16. Each wire 12 is formed into a point 17 of slightly greater cross section than the wire 12. The probe point 17 on the wire 12 retains the wire 12 in the film 15 against withdrawal through the film 15 as shown in FIGURE 3. A suitable coating 18 around wires 12 on the inboard side anchors the wires 12 against lengthwise shifting and displacement in the perforations 16.

The probe head of this invention may be assembled by any suitable procedure which results in the anchoring of probe points on one side of a perforated transparent resilient film and connecting the probe wire on the other side of the film to a connection to the test apparatus.

Referring again to FIGURE 1 the card 11 is cut from a sheet of suitable rigid insulating material, preferably having a thickness of about 1 mm. Representative dimensions are 10 cm. long and about 5 cm. wide. The aperture 14 is about 1 cm. diameter. The connecting contacts 13 are printed on the major surface A by a suitable printed circuit technique. As many as fifty contacts 13 can be applied to the card 11, each contact corresponding to a terminal or probe area of the device to be tested.

One method which has been used for producing the perforated flexible film is illustrated in FIGURES 4a–c. A thin sheet of Mylar is cut into the film element 15 and mounted on a supporting frame 19 so that it is stretched across the open center of the frame, FIGURE 4a. The frame 19 is then mounted in a micropositioner, not shown, and oriented in the micropositioner between a punch 20 and a die 21 shown in FIGURE 4b. Actuation of the punch 20 may be manual or automatic. The frame 19 may be moved between the punch 20 and the die 21 in the X and Y planes by the micropositioner. The minute perforations 16 are punched in the film 15 by the punch 20 having a diameter of the order of 0.0012 inch, for example, forming perforations 16 of the order of 1.2 to 1.4 mils. The perforations are formed in any desired pattern in the X and Y planes according to the programming of a design in these coordinates in the micropositioner. A suitable additional optional device, not shown, associated with this step is a device for comparing the alignment to a standard.

The film element 15 is then removed from the frame 19 and adhered to the surface B of the card 11, as shown in FIGURE 4c. The perforations 16 are positioned in the film element 15 to align with the aperture 14 and are more or less centrally located with respect to the circumference of the aperture 14.

In one embodiment, the wire 12 of gold and having a diameter of the order of a mil or less is cut and formed with a knob-like end by flaming off with a hydrogen torch to create the probe point 17. The wire 12 is then inserted in the mounted film element 15 through a perforation 16 from the outboard side B until knob-like probe point 17 is brought into contact with the outboard side of the film element 15 as shown in FIGURE 3. As shown in FIGURE 2, the end of each wire 12 diametric to the probe point 17 is electrically connected to one of the contacts 13 by a suitable technique such as thermo-bonding.

Next the entire probe head is submerged in a suitable plating solution, preferably of gold or rhodium and the coating 18 is built up on the wires 12 particularly in the area directly adjacent to the film element 15 to captivate the wire 12 and prevent movement of the wires through the perforations 16 and shifting or looseness of the wires 12. As illustrated in FIGURE 3 the lead wires 12 anchored in the film element 15 may be juxtaposed on centers as close as 5 mils. The completed probe head 10 may then be finished by applying a protective covering, not shown, over the surface to shield the contacts 13 and the bonds 22, for example, a transparent insulating film may be cemented on the major surface A.

PROBE HOLDER ASSEMBLY

The probe head 10 is supported in a probe holder assembly 24 for the probing operation. The novel probe holder assembly 24 illustrated in FIGURES 5 and 6 includes a cylindrical housing 25 into which the probe head 10 is inserted. The probe head 10 extends laterally from the housing 25 and a tongue 26 formed at the end of the probe head 10 projects into a connecting receptacle 27 equipped with terminals corresponding to each of the contacts 13 on the probe head 10. The receptacle 27 is attached to a lead conduit 28 which contains individual leads for each contact 13 connected to a test station. The probe holder assembly 24 holding the probe head 10 for test is mounted so as to position the probe head 10 directly above and close to a wafer holding means 29. The wafer holding means 29 includes a base assembly 30 adjustable in the X–Y coordinates and a chuck 31 on which the wafer to be tested is directly supported and which is adjustable in the Z coordinate. A wafer 32 is shown in FIGURE 5 on the chuck 31 directly beneath the probe head assembly 24. The integrated circuits, not shown, of the wafer 32 are positioned directly beneath the aperture 14 so that the probe points 17 may be brought into contact with IC probe areas.

The vertical section of FIGURE 6 shows the probe head 10 installed in ways 33 in the housing 25. The longitudinal sides of the card 11 are each rabbetted having grooves 34 to position the probe head in the housing 25.

A threaded sleeve 35 positioned within housing 25 is externally threaded to screw into internal threads provided in the housing 25. Seals between the sleeve 35 and the housing 25 and probe head 10 make an airtight chamber 36 within the sleeve 35. A face seal 37 is provided between the end of the sleeve 35 and the probe head 10. A lower seal 38 and a top seal 39 are provided between the sleeve 35 and the housing 25. A transparent window 40 across the top of the sleeve 35 permits visual observation of the probe head 10 and the major surface A. Through the aperture 14 the film element 15 can be seen. The film element 15 being in turn transparent permits inspection of the wafer directly adjacent the aperture 14.

Contact between the probe points 17 and the probe areas on the wafer 32 may be achieved by two different procedures. One effective procedure is the increase of gas pressure within the chamber 36 to flex the resilient film element 15 and thereby urge the probe points 17 into contact with the matching probe areas. Another possible procedure for establishing electrical contact is to either lower the probe holder assembly 24 or to raise the wafer 32 along the Z coordinate and the contact between points 17 and the probe areas may be effected by a combination of these movements.

The sleeve 35 is provided with a port 41 and the housing 25 is provided with a corresponding air inlet 42 connected by an annular distributing enclosure 43 for suitably adjusting the positive gas pressure within the gas chamber 36. When the pressure is increased, the flexible film 15 bows outward and downward to bring the probe points 17 into contact with the probe areas under a soft gentle spring pressure when contact is made. Various probe heads 10 are readily interchanged in the probe holder assembly 24 and receptacle 27. To change probe heads 10 the sleeve 35 is loosened by a slight turn releasing the seal 37. The probe head 10 is unplugged from the receptacle 27 and withdrawn from the ways 33. The new probe head 10 is inserted in the ways 33 and plugged into the receptacle 27 to complete the replacement.

The assembled probing apparatus is shown in additional detail in FIGURE 7. The means 29 for holding the wafer for testing includes a frame member 44, a base plate 46 rotatably mounted on the wafer mount 45 and rotatable by turning the knob 47 and a worm gear, not shown, which is operatively positioned between the plate 46 and the mount 45. The wafer 32 is suitably held in place. Prior to probing the device is rotated by turning the knob 47 so as to aid in alignment with the probe head 10. Upon completion of probing the wafer 32 may be slid out from under the probe head 10.

As described above, the probe assembly means carries a probe head 10 which is designed to match the configuration of the probe areas of the device to be tested. Each probe head 10 is provided with a requisite number of probe points 17. Once the probe head 10 is made for a single device and the position of the device on the device holder 29 has been set, the probe head points 17 are adjusted to the probe areas of all of the devices which are essentially identical from device to device over the entire surface of a common wafer. The wafer holding means 29 are indexed accurately and well within the tolerance of the matching probe points or probe areas. The wafer holding means 29 and the probe holding assembly 24 are programmed to accurately index with respect to each other along the X and Y coordinates so that the probe areas of each individual die are successively contacted by the probe points 17 of the singular probe head 10. The air pressure on the flexible film element 15 moves the probe points 17 in the Z coordinate to bring the probe points into contact with the probe areas. The air pressure can be adjusted to assure that the dice are tested with uniform contact pressure. A microscope 48 permits an operator to view the alignment through the window 40, the chamber 26 and the transparent film element 15.

It will be seen that the configurations being tested may vary from semiconductor wafer to semiconductor wafer. Various probe heads 10 may be prepared to match these variations in configuration. The probe head 10 can be installed in the probe holder assembly 24 as readily as the semiconductor wafer can be mounted on the wafer holding means 29. It will also be seen that the above-described adjustability in the X–Y coordinates combined with the visual observation through the microscope permits delicate and accurate adjustment of the probe points to the probe areas.

The components which may be tested on the apparatus of this invention include integrated circuits and transistors. Consequently, this apparatus provides ready adaptation to various types of electrical equipment. At the same time accurate testing is afforded by the excellent electrical contact with the tested areas.

At a low cost the probe head design can accommodate as many areas for testing as may be encountered in practice. A further advantage is the elimination of the danger of scuffing the metallized probe areas.

It will be further understood that the description of the preferred embodiment set forth above together with the figures is presented for the purpose of illustration only. For example, while in the described embodiment the probe head and tested subject are positioned beneath the probe holding means, it will be understood that other arrangements of the probe head and holding means are within the spirit of this invention. Moreover, although silicon is identified as the material of the devices being probed this does not limit the scope of the invention.

I claim:

1. A probe head for electrically contacting closely spaced electrical terminal areas comprising an insulating card, an aperture formed in said card, a thin flexible insulating film secured to said card and extending across the aperture, a plurality of electrical contacts on one surface of said card each proceeding from the aperture to a common terminal area of the card remote from said aperture, closely spaced separate perforations of limited diameter in the film, one or more wires each passing through one of said perforations and anchored therein by a knob larger than said perforation on the end of each wire on the side of said film opposite to said electrical contacts and by a coating on said wire on the opposite side of said film from said knob, each of said wires being insulated from one another by said film and electrically connected to one of said contacts.

2. A probe head as claimed in claim 1 in which said thin flexible film is transparent.

3. A probe head as claimed in claim 1 in which said thin flexible film is comprised of high resistivity and high tensile strength material.

4. A probing device for successively probe contacting a plurality of electrical units formed in a common wafer, each unit having one or more areas for contacting, said device comprising a probe head for electrically contacting said areas, said probe head including an insulating card, an aperture formed in said card, a thin flexible insulating film attached to said card and extending across the aperture, a plurality of electrical contacts on one surface of the card each proceeding from the aperture to a common terminal area of the card remote from said aperture, closely spaced separate perforations of limited diameter in the film, one or more wires each passing through one of said perforations and anchored therein by a knob larger than said perforation on the end of each wire on the side of said film opposite to said electrical contacts and by a coating on said wire on the opposite side of said film from said knob, and each of said wires being electrically connected to one of said contacts and insulated from one another by said film, and holding means including gas pressure means for positioning said card for probe contacting of said areas.

References Cited

UNITED STATES PATENTS

| | | | |
|---|---|---|---|
| 3,445,770 | 5/1969 | Harmon | 324—158 |
| 3,137,815 | 6/1964 | Hershey | 324—158 |
| 3,307,246 | 3/1967 | Gulliksen | 339—17 XR |
| 3,334,275 | 8/1967 | Mandeville | 174—68.5 XR |
| 3,405,361 | 10/1968 | Kattner | 324—158 |

OTHER REFERENCES

IBM Technical Disclosure Bulletin, "Four Point Probe" (A. Kennedy), vol. 5, No. 10, March 1963, pages 33–34.

RUDOLPH V. ROLINEC, Primary Examiner

E. L. STOLARUN, Assistant Examiner